(12) United States Patent  
Suzuki et al.

(10) Patent No.: US 7,100,553 B2  
(45) Date of Patent: Sep. 5, 2006

(54) ACTUATOR FOR VALVE LIFT CONTROL DEVICE HAVING CAM MECHANISM

(75) Inventors: Yasuyoshi Suzuki, Chiryu (JP); Akihiko Kameshima, Hekinan (JP); Hideo Inaba, Okazaki (JP); Jouji Yamaguchi, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/156,487

(22) Filed: Jun. 21, 2005

(65) Prior Publication Data

US 2006/0000433 A1 Jan. 5, 2006

(30) Foreign Application Priority Data

Jul. 1, 2004 (JP) ............................. 2004-195784

(51) Int. Cl.  
*F01L 1/34* (2006.01)

(52) U.S. Cl. ................. 123/90.16; 123/90.31; 74/569

(58) Field of Classification Search ............. 123/90.15, 123/90.16, 90.17, 90.18, 90.27, 90.31; 74/567, 74/569  
See application file for complete search history.

(56) References Cited

U.S. PATENT DOCUMENTS

| 6,425,357 | B1 | 7/2002 | Shimizu et al. | 123/90.16 |
| 7,004,127 | B1 * | 2/2006 | Shibata et al. | 123/90.16 |
| 2004/0083997 | A1 | 5/2004 | Shibata et al. | 123/90.16 |

* cited by examiner

*Primary Examiner*—Thomas Denion  
*Assistant Examiner*—Ching Chang  
(74) *Attorney, Agent, or Firm*—Nixon & Vanderhye P.C.

(57) ABSTRACT

An actuator for a valve lift control device linearly moves a control shaft to change a valve lift in accordance with an axial position of the control shaft. A first and a second rotation cam integrally rotate around a common rotation axis by transmission of torque, so that a direct acting follower, which includes a first and a contact members, linearly moves with a control shaft. The first and a second rotation cams are respectively in contact with the first and the second contact members via a first and a second contact points. The first contact point is located on the opposite side of the second contact point with respect to the rotation axis. A sum of a first rotation cam lift of the first rotation cam and a second rotation cam lift of the second rotation cam is substantially constant in a predetermined rotation angular range of the first rotation cam and the second rotation cam.

4 Claims, 10 Drawing Sheets

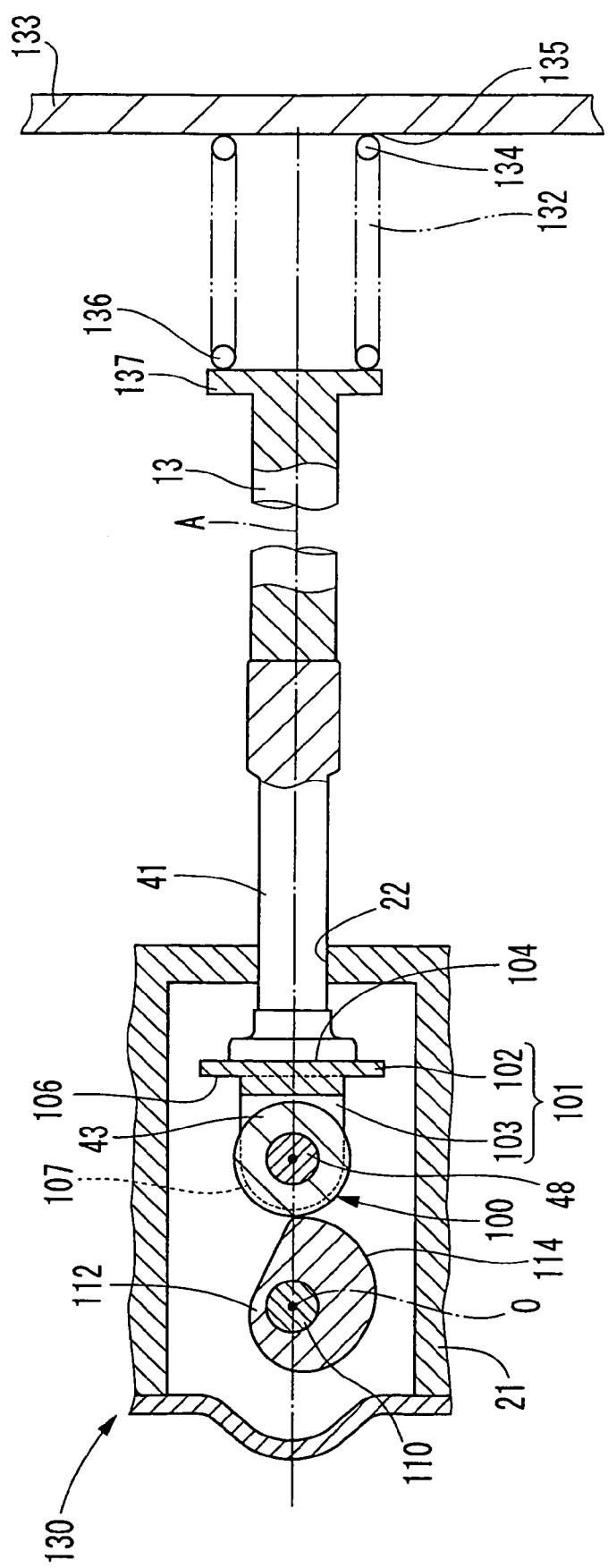

ACTUATOR FOR VALVE LIFT CONTROL DEVICE HAVING CAM MECHANISM

CROSS REFERENCE TO RELATED APPLICATIONS

This application is based on and incorporates herein by reference Japanese Patent Application No. 2004-195784 filed on Jul. 1, 2004.

FIELD OF THE INVENTION

The present invention relates to an actuator for a valve lift control device, the actuator controlling a valve lift of at least one of an intake valve and an exhaust valve in an internal combustion engine.

BACKGROUND OF THE INVENTION

According to U.S. 2004/0083997A1 (JP-A-2004-150332), a conventional valve lift control device axially moves a control shaft to change a valve lift in accordance with the axial position of the control shaft. In this structure, a rotation cam and a contact member, which are in contact with each other, are used as an actuator that axially moves the control shaft. Torque is transmitted to a rotation cam, so that the rotation cam is driven. The contact member, which is a direct acting follower, links with the control shaft.

In this structure, the contact member is in contact with the rotation cam. Accordingly, when reactive force applied from a valve onto the control shaft becomes excessively small, and when the rotation cam rotates to the side, in which a cam lift decreases, the contact member may depart from the rotation cam. When the contact member departs from the rotation cam, the valve lift cannot be controlled, and an engine performance becomes unstable.

SUMMARY OF THE INVENTION

In view of the foregoing problems, it is an object of the present invention to provide an actuator for a valve lift control device that controls a valve lift while an engine performance is stably maintained.

According to the present invention, an actuator is used for a valve lift control device that controls valve lift of at least one of an intake valve and an exhaust valve of an internal combustion engine. The actuator linearly moves a control shaft in an axial direction of the control shaft to change the valve lift in accordance with a position of the control shaft in the axial direction of the control shaft. The actuator includes a first rotation cam, a second rotation cam, and a direct acting follower.

The first rotation cam and the second rotation cam integrally rotate around a common rotation axis by transmission of torque. The direct acting follower includes a first contact member and a second contact member. The first contact member is in contact with the first rotation cam via a first contact point. The second contact member is in contact with the second rotation cam via a second contact point. The direct acting follower linearly moves with the control shaft as the first rotation cam and the second rotation cam rotate. The first contact point is located on a substantially opposite side of the second contact point with respect to the common rotation axis. The first rotation cam has a first rotation cam lift at the first contact point. The second rotation cam has a second rotation cam lift at the second contact point. The first rotation cam lift and the second rotation cam lift have a sum thereof. The sum of the first rotation cam lift and the second rotation cam lift is substantially constant in a predetermined rotation angular range of the first rotation cam and the second rotation cam.

The sum of the first rotation cam lift and the second rotation cam lift is substantially constant substantially throughout the predetermined rotation angular range, in which the first rotation cam and the second rotation cam are rotatable.

The first rotation cam has a first rotation cam profile. The second rotation cam has a second rotation cam profile. The first rotation cam profile and the second rotation cam profile are substantially axisymmetric with respect to an imaginary line, which is perpendicular to the common rotation axis.

Thereby, the first cam is constantly in contact with the first contact member, and the second cam is constantly in contact with the second contact member in the predetermined rotation angular range. Thereby, the direct acting follower is capable of steadily performing linear movement as the first and second cams, rotate, regardless of valve reactive force applied to the control shaft. Therefore, the first and second cams do not depart respectively from the first and second contact members while making contact respectively with the first and second contact members, so that noise and abrasion can be restricted from arising.

Alternatively, an actuator for the valve lift control device includes a rotation cam, a direct acting follower, and a biasing member. The rotation cam rotates around a rotation axis by transmission of torque. The direct acting follower includes a contact member that is in contact with the rotation cam. The direct acting follower linearly moves with the control shaft as the rotation cam rotates. The biasing member biases the contact member to the rotation cam.

The biasing member biases the contact member in a direction, which is equivalent to a direction, in which valve reactive force acts to the control shaft. The actuator further includes a fixed member that is fixed in position with respect to the internal combustion engine. The biasing member biases the contact member using resilience of a spring that has a first end hooking to the fixed member.

Thereby, the contact member is capable of being pressed onto the cam, even when the valve reactive force acting to the control shaft becomes excessively small. Thereby, the direct acting follower and the control shaft are capable of being linearly moved steadily in accordance with rotation of the cam, and the valve lift is capable of being changed steadily in accordance with the axial position of the control shaft, regardless of the valve reactive force. Thus, in this structure, the valve lift can be controlled, while engine performance is maintained.

BRIEF DESCRIPTION OF THE DRAWINGS

The above and other objects, features and advantages of the present invention will become more apparent from the following detailed description made with reference to the accompanying drawings. In the drawings:

FIG. 10 is a partially cross sectional side view showing an actuator of the valve lift control device according to a fourth embodiment of the present invention;

DETAILED DESCRIPTION OF PREFERRED EMBODIMENTS

First Embodiment

Figure 1A:
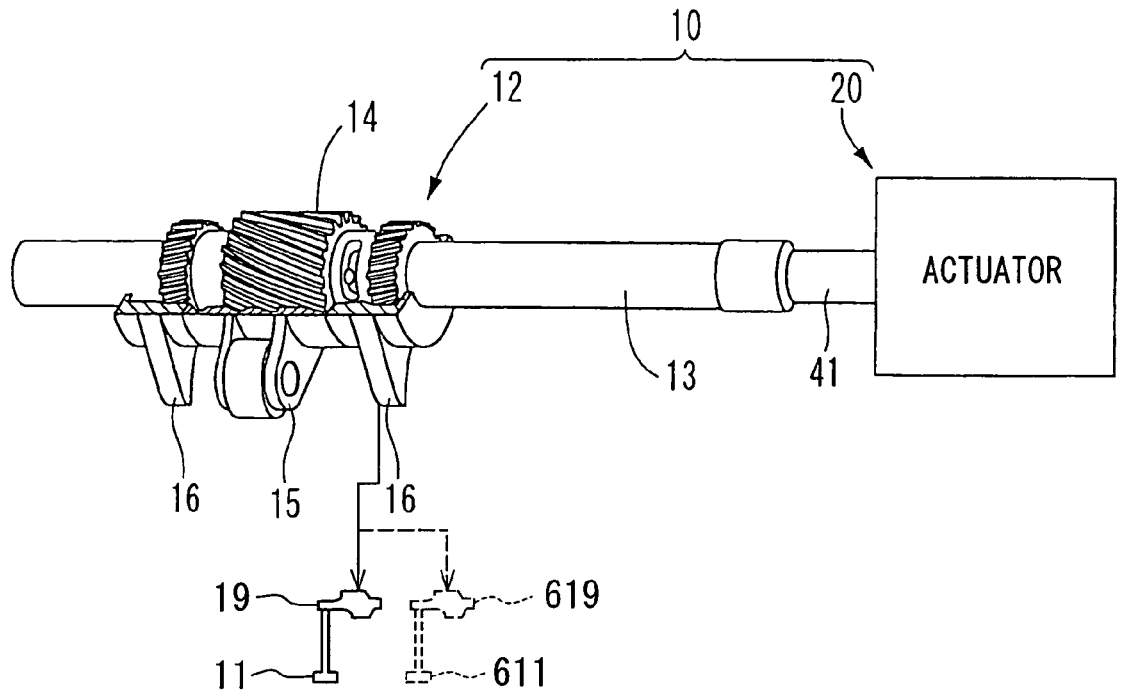
FIG. 1A is a partially cross sectional view showing a valve lift control device.
Figure 1B:
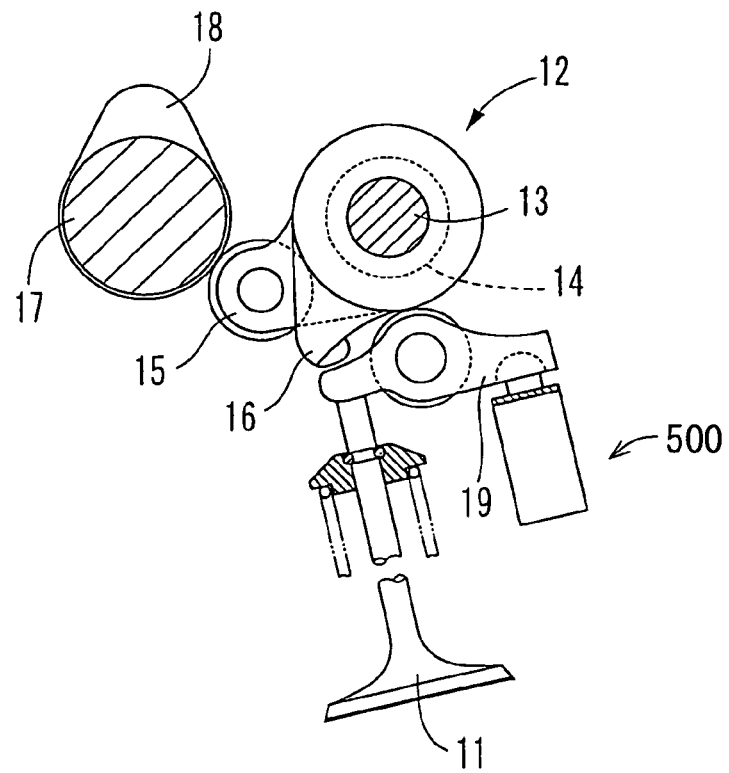
FIG. 1B is a front view showing the valve lift control device according to a first embodiment of the present invention.

As shown in FIGS. 1A, 1B, a valve lift control device 10 is mounted to an engine 500 of a vehicle. The valve lift control device 10 controls an intake valve 11 of the engine 500 in valve lift, i.e., stroke of the intake valve 11. The valve lift control device 10 is constructed of a variable device 12 and an actuator 20.

The variable device 12 has a structure, which incorporates by reference U.S. Pat. No. 6,425,357B2 (JP-A-2001-263015). The variable device 12 includes a slider gear 14, which is capable of moving with a control shaft 13 in the axial direction of a control shaft 13. An input portion 15 and oscillating cams 16 engage with the slider gear 14 in a helical spline manner.

A difference in relative phase among the input portion 15 and the oscillating cams 16 changes in accordance with the axial position of the control shaft 13. The input portion 15 is in contact with an intake cam 18 of a camshaft 17. The oscillating cam 16 is capable of being in contact with a rocker arm 19 of the intake valve 11.

An oscillating angle, i.e., swaying angle of the rocker arm 19 changes in accordance with the difference in relative phase between the input portion 15 and the oscillating cam 16. Therefore, the valve lift of the intake valve 11 changes in conjunction with change in the axial position of the control shaft 13 in the variable device 12. In this embodiment, reactive force (valve reactive force) is transmitted from the intake valve 11 to the control shaft 13, and the valve reactive force acts on the control shaft 13 as an axial force, which is oriented to the opposite side of the actuator 20.

Figure 3:
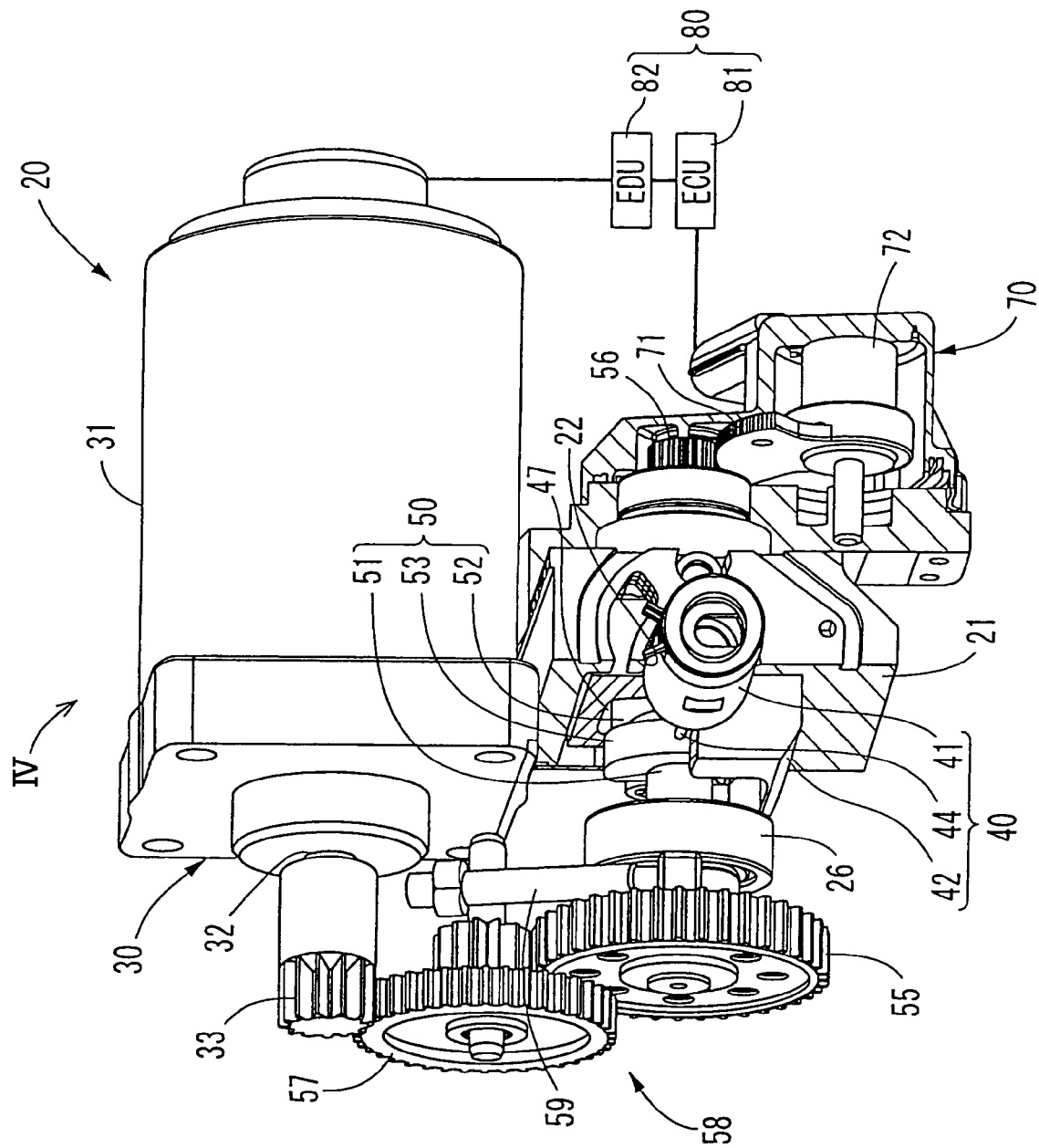
FIG. 3 is a partially cross sectional perspective view showing an actuator of the valve lift control device according to the first embodiment.
Figure 4:
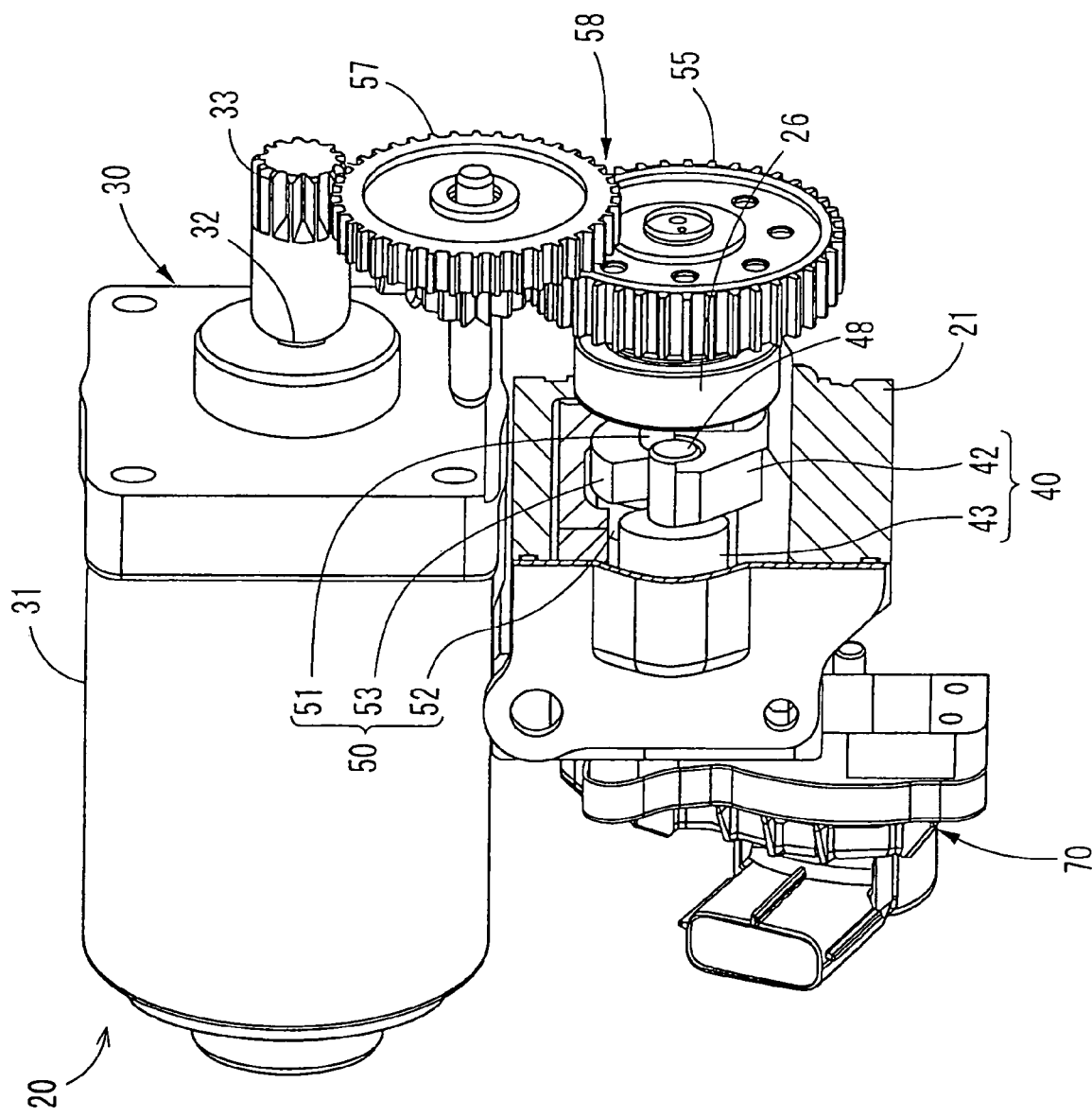
FIG. 4 is a partially cross sectional perspective view when being viewed from the arrow IV in FIG. 3.
Figure 5:
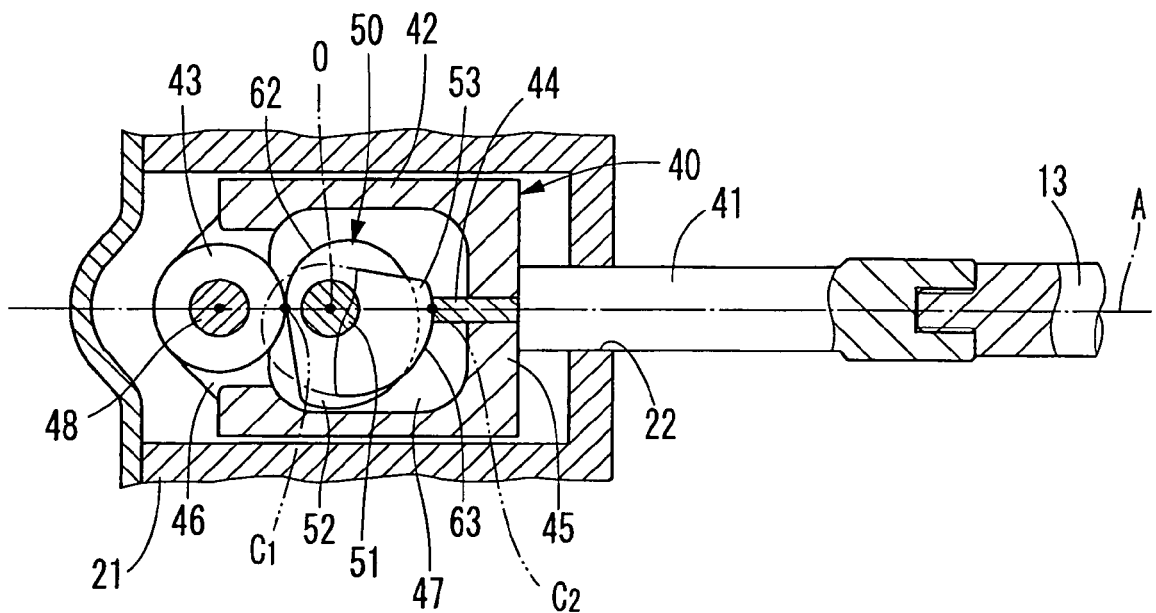
FIG. 5 is a partially cross sectional side view showing the actuator of the valve lift control device according to the first embodiment.

The actuator 20 linearly moves the control shaft 13 of the variable device 12 in the axial direction. As shown in FIGS. 3 to 5, the actuator 20 includes a housing 21, an electric motor 30, a direct acting follower 40, a composite cam 50, an angular sensor 70, and a motor operating device 80. The housing 21 is secured to the engine 500, so that the housing 21 does not move relative to the engine 500. The housing 21 has a circular hole 22 coaxially with the control shaft 13.

The electric motor 30 is a brushless motor, which includes a motor cover 31 accommodating a motor shaft 32 and a coil (not shown). The motor cover 31 is fixed to the housing 21, so that the motor cover 31 does not move relative to the housing 21. The motor shaft 32 has an output end, which is provided with a motor gear 33. The coil of the electric motor 30 is connected with an EDU 82 of the motor operating device 80. The EDU 82 supplies electricity to the coil, so that torque is generated in the motor shaft 32. Thereby, the motor shaft 32 rotates in the forward direction and the reverse direction in conjunction with the motor gear 33.

The direct acting follower 40 includes an output shaft 41, a movable member 42, a roller 43 (FIG. 4), and a contact member 44. As shown in FIG. 5, one end of the output shaft 41 coaxially links with an end of the control shaft 13 on the side opposite to the end, to which the slider gear 14 is provided. The output shaft 41 engages with circular hole 22 of the housing 21 slidably relative to each other. The movable member 42 has a space 47 that penetrates both ends 45, 46 of the movable member 42. The one end 45 of the movable member 42 is secured to the other end of the output shaft 41 on the side opposite to the end of the output shaft 41 linking with the control shaft 13. Thereby, the one end 45 of the movable member 42 does not move relative to the output shaft 41. A roller 43 is rotatably supported by the other end 46 of the movable member 42 on the side opposite to the end 45, to which the output shaft 41 is connected, such that the roller 43 is rotatable in the forward and reverse directions. The roller 43 serves as a first contact member. The movable member 42 has a rotary shaft 48 for the roller 43. The rotary shaft 48 is perpendicular to the axis A of the control shaft 13. The contact member 44 serves as a second contact member. The contact member 44 is secured to the end 45 of the movable member 42, to which the output shaft 41 is connected, such that the contact member 44 does not move relative to the movable member 42. The contact member 44 is formed in a cylindrical column shape axially along the axis A of the control shaft 13. The contact member 44 protrudes from the inner wall of the end 45 of the movable member 42 to the side opposite to the output shaft 41, and the protruding portion of the contact member 44 is received in the space 47. Thereby, in the above structure, the output shaft 41 of the direct acting follower 40 (FIG. 1A), the movable member 42, the roller 43, and the contact member 44 are linearly movable with the control shaft 13.

The composite cam 50 includes a camshaft 51 and two kinds of rotation cams (first and second cams) 52, 53. The camshaft 51 is rotatably supported by the housing 21 via a bearing 26 (FIG. 3) such that the camshaft 51 becomes perpendicular to the axis A of the control shaft 13. A cam driving gear 55 and a sensor driving gear 56 are respectively provided to both the ends of the camshaft 51. A middle gear 57 engages with the cam driving gear 55, and engages with the motor gear 33, so that a reduction device 58 is constructed. In the reduction device 58, torque generated by the electric motor 30 is increased, and is transmitted to the camshaft 51.

The first and second cams 52, 53 are mounted to the camshaft 51, so that the first and second cams 52, 53 are capable of integrally rotating in the forward and reverse directions around the common axis O. A stopper 59 (FIG. 3) is mounted to the cam driving gear 55, and the stopper 59 abuts onto a hook (not shown) of the housing 21, so that a rotative angular range (allowable range) Wθ is defined for the first and second cams 52, 53. Thereby, the first and second cams 52, 53 are rotatable within the allowable range Wθ. The first and second cams 52, 53 are accommodated in the space 47 of the movable member 42. The first cam (first rotation cam) 52 has an outer periphery that forms a cam face 62, and the second cam (second rotation cam) 53 has an outer periphery that forms a cam face 63. The cam face 62 of the first cam 52 is in contact with the outer periphery of the roller 43, and the cam face 63 of the second cam 53 is in contact with the end face of the protruding portion of the contact member 44 in the space 47. The first cam 52 contacts with the roller 43 at a contact point (first contact point) C1. The second cam 53 contacts with the contact member 44 at a contact point (second contact point) C2. In this embodiment, the common axis (rotation axis) O is interposed between the first contact point C1 and the second contact point C2, which are located on both sides. Specifically, the first contact point C1 is located on a substantially opposite side of the second contact point C2 with respect to the rotation axis O.

Figure 2:
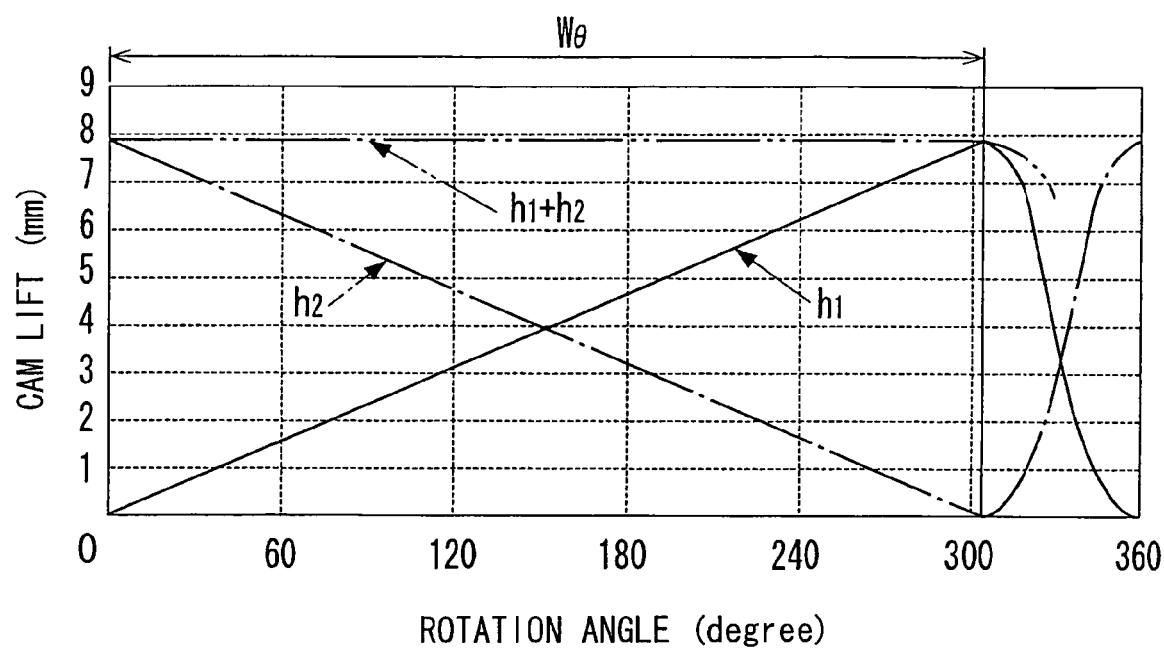
FIG. 2 is a graph showing a relationship between a valve lift and a rotation angle of a cam according to the embodiment.

As shown in FIG. 2, the cam face 62 of the first cam 52 has a cam profile that is set such that a cam lift h1 becomes substantially proportional to the rotation angle of the first and second cams 52, 53. The rotation angle of the first and second cams 52, 53 is defined within the allowable range Wθ.

A proportionality factor P of the cam lift h1 with respect to the rotation angle is calculated by the following formula.

$$P = h1\max / W\theta$$

Figure 6:
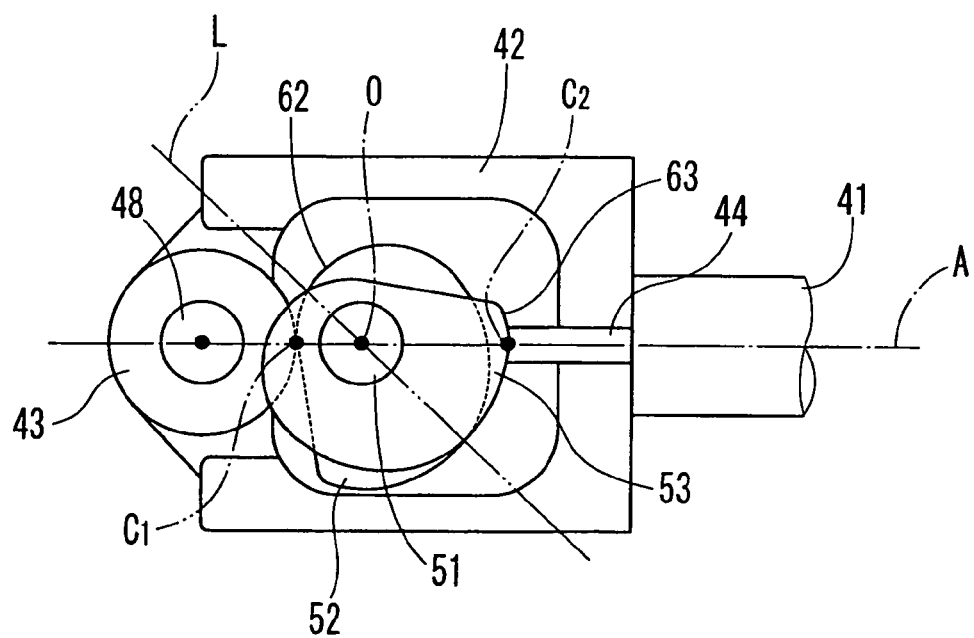
FIG. 6 is a schematic side view showing the actuator of the valve lift control device according to the first embodiment.

Here, the h1max represents the maximum value of the cam lift h1, and the Wθ represents the allowable range Wθ. The cam face 63 of the second cam 53 has a cam profile. As shown in FIG. 6, the cam profile of the cam face 63 of the second cam 53 and the cam profile of the cam face 62 of the first cam 52 are substantially axisymmetric with respect to an imaginary line L, which is perpendicular to the rotation axis O.

Here, the cam lift at the contact point shows the difference between the diameter of the cam at the contact point and the radius of the base circle of the cam.

That is, as referred to FIG. 1, the cam profile of the cam face 63 of the second cam 53 is set such that a cam lift h2 of the second cam 53 is substantially proportional with respect to the rotation angle of the first and second cams 52, 53 within the allowable range Wθ. A proportionality factor −P is set between the cam lift h2 and the rotation angle.

In this embodiment, the relative position of the imaginary line L is defined with respect to the first cam 52 such that the sum of the cam lift h1 of the first cam 52 at the first contact point C1 and the cam lift h2 of the second cam 53 at the second contact point C2 becomes substantially constant substantially throughout the allowable range Wθ. Therefore, the distance between the first contact point C1 and the second contact point C2 becomes substantially constant in the allowable range Wθ, so that the first and the second cams 52, 53 regularly makes contact respectively with the roller 43 and the contact member 44.

As referred to FIG. 3, the angular sensor 70 includes a sensor gear 71, which engages with the sensor driving gear 56. The angular sensor 70 detects the rotation angle of a magnet holder 72, which rotates with the sensor gear 71, using a hall element or the like. The angular sensor 70 is connected with an ECU 81 of the motor operating device 80, so that the angular sensor 70 transmits a detection signal of the rotation angle to the ECU 81.

The motor operating device 80 includes the ECU 81 and the EDU 82. The ECU 81 receives various signals such as the detection signal transmitted from the angular sensor 70, rotation speed of the engine 500, and a throttle position. Thereby, the ECU 81 controls the EDU 82, the engine 500, and the like in accordance with the various signals. The EDU 82 supplies electricity to the electric motor 30 to operate the electric motor 30 in accordance with control performed by the ECU 81.

In the valve lift control device 10, when the electric motor 30 is supplied with electricity by the EDU 82, the electric motor 30 generates torque, and the torque is transmitted to the camshaft 51 via the reduction device 58. Thereby, the first and the second cams 52, 53 rotate by the torque transmitted from the electric motor 30, while the first and the second cams 52, 53 making contact respectively with the roller 43 and the contact member 44. In this situation, the sum of the cam lift h1 of the first cam 52 at the first contact point C1 and the cam lift h2 of the second cam 53 at the second contact point C2 is substantially constant. Therefore, the direct acting follower 40 linearly moves with the control shaft 13 corresponding to the cam profiles of the first and second cams 52, 53. In this case, the variable device 12 changes the valve lift as the control shaft 13 linearly moves, so that the valve characteristics of the engine, such as the angle of action and the maximum valve lift can be controlled.

In this embodiment, the first cam 52 is constantly in contact with the roller 43 and second cam 53 is constantly in contact with the contact member 44 in the allowable range Wθ. Thereby, the direct acting follower 40 is capable of steadily performing linear movement as the first and second cams 52, 53 rotate, regardless of the valve reactive force applied to the control shaft 13. Therefore, the variable device 12 is capable of steadily changing the valve lift in accordance with the position in the axial direction of the control shaft 13, which linearly moves with the direct acting follower 40. In this structure, the valve lift can be controlled, while engine performance is maintained. Besides, the first and second cams 52, 53 do not depart respectively from the roller 43 and the contact member 44 while making contact respectively with the roller 43 and the contact member 44, so that noise and abrasion, which are due to repeating departure and contact, can be restricted from arising.

Second Embodiment

Figure 7:
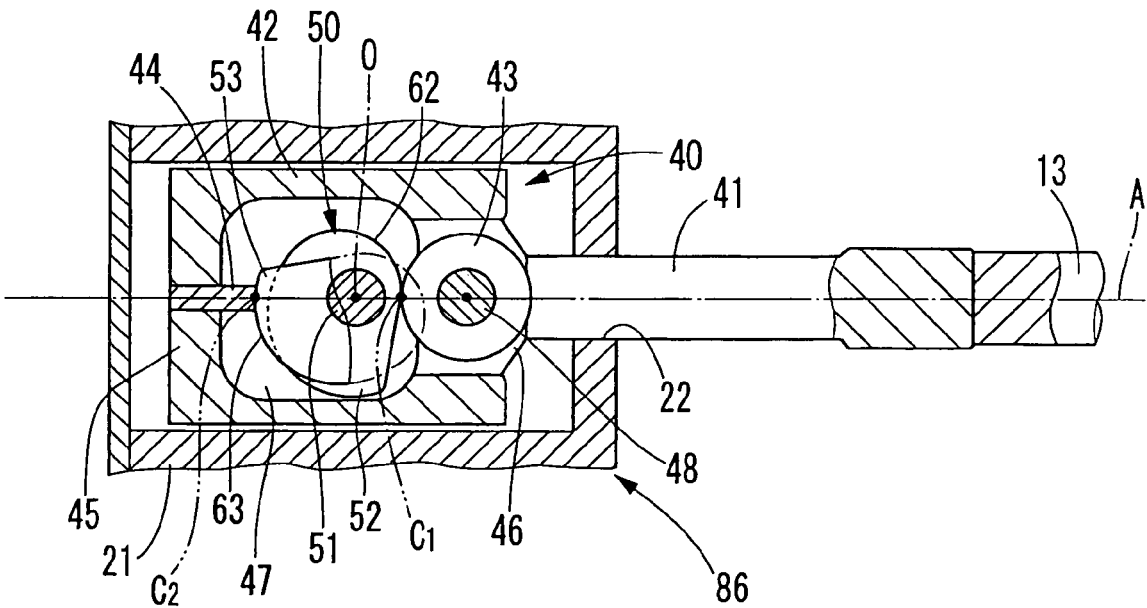
FIG. 7 is a partially cross sectional side view showing an actuator of the valve lift control device according to a second embodiment of the present invention.
Figure 8:
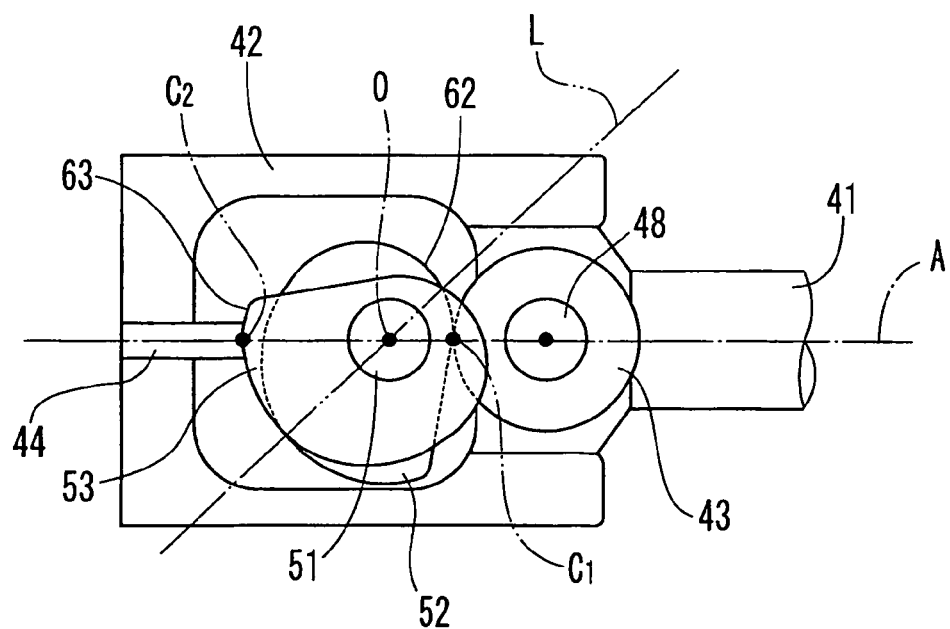
FIG. 8 is a schematic side view showing the actuator of the valve lift control device according to the second embodiment.

The second embodiment is a variation of the first embodiment. As shown in FIGS. 7, 8, in this embodiment, the valve reactive force acts onto the control shaft 13 as an axial force to the side of an actuator 86. In the actuator 86, the movable member 42 has the other end 46, which rotatably supports the roller 43, secured to the output shaft 41, such that the other end 46 does not move relative to the output shaft 41. Besides, in the actuator 86, the contact member 44 protrudes from the inner wall of the end 45 of the movable member 42 to the side of the output shaft 41. Excluding these structures, the actuator 86 in this embodiment has the structure equivalent to the structure of the actuator 20 in the first embodiment. The structure in the second embodiment produces an effect similarly to the first embodiment.

Third Embodiment

Figure 9A:
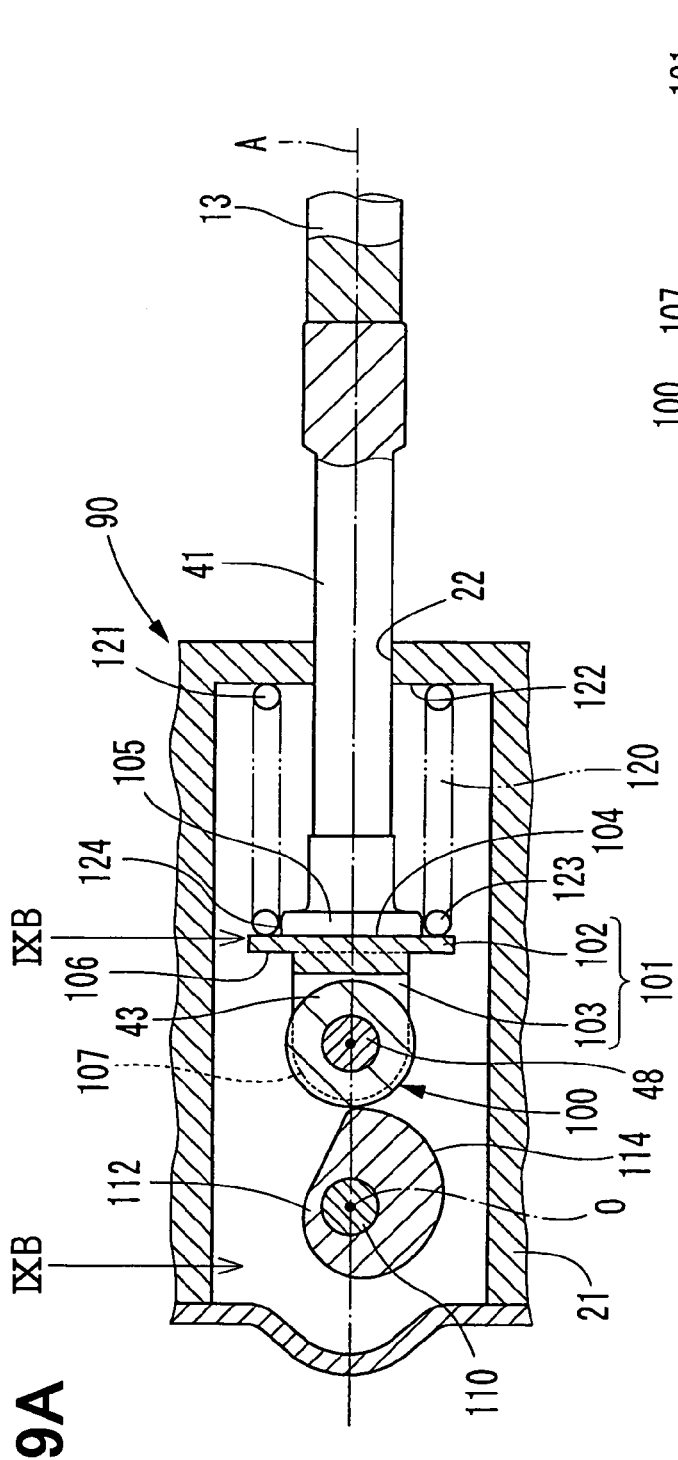
FIG. 9A is a partially cross sectional side view showing an actuator of the valve lift control device according to a third embodiment of the present invention.
Figure 9B:
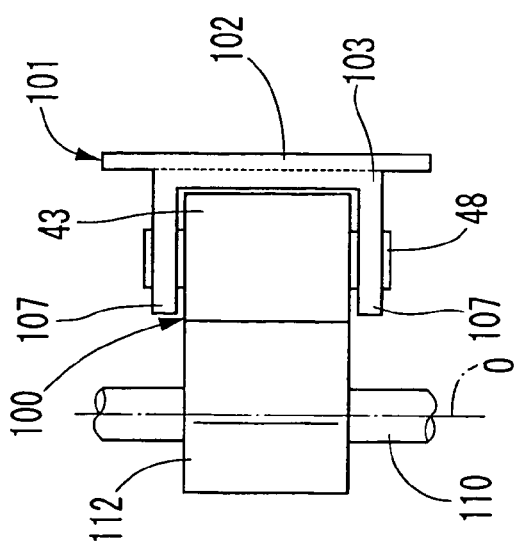
FIG. 9B is a top view when being viewed from the arrows IXB in FIG. 9A.

The third embodiment is a variation of the first embodiment. As shown in FIGS. 9A, 9B, in this embodiment, the valve reactive force acts onto the control shaft 13 as an axial force to the side of an actuator 90. The actuator 90 includes a direct acting follower 100. A movable member 101 is not provided with the contact member 44, and is provided with a connecting portion 102 and a shaft support 103 in the direct acting follower 100. The connecting portion 102 is formed in a plate shape, which is perpendicular to the axis A of the control shaft 13. The connecting portion 102 has a plate face 104 on one side. The output shaft 41 has an end 105 on the side opposite to its end, which links with the control shaft 13. The end 105 of the output shaft 41 connects with the plate face 104 of the connecting portion 102. The connecting portion 102 has a plate face 106 on the side opposite to the plate face 104, to which the output shaft 41 is connected. The shaft support 103 protrudes from the plate face 106 of the connecting portion 102 to the side opposite to the output shaft 41.

The shaft support 103 is formed in a U-shape in cross section (FIG. 9B). The U-shape of the shaft support 103 opens to the side, to which the shaft support 103 protrudes. The shaft support 103 has two arms 107, which are in parallel with each other interposing the axis A of the control shaft 13. The two arms 107 rotatably support the roller 43, which serves as a contact member. In the above structure, the roller 43 of the direct acting follower 100, the output shaft 41, which constructs a main body of the direct acting follower 100, and the movable member 101 are capable of linearly moving with the control shaft 13.

The actuator 90 includes a cam 112, which has a camshaft 110 instead of the composite cam 50. The camshaft 110 has two ends, to which the cam driving gear 55 and the sensor driving gear 56 are mounted. The camshaft 110 is rotatably supported by the housing 21 via the bearing 26. Thereby, the cam 112 is capable of rotating in the forward and reverse directions around the rotation axis O. The cam 112 is arranged on the side opposite to the connecting portion 102 of the roller 43 in the axial direction of the control shaft 13. The cam 112 has the outer periphery, which forms a cam face 114 that is in contact with the outer periphery of the roller 43. When the cam 112 rotates, the direct acting follower 100 linearly moves in the axial direction of the control shaft 13 in accordance with the cam profile of the cam face 114, with which the roller 43 is in contact. Thereby, the control shaft 13, which links with the movable member 101 of the direct acting follower 100, linearly moves in the axial direction.

A spring 120 is interposed between the housing 21 and the direct acting follower 100 in the actuator 90. The spring 120 serves as a biasing member. The housing 21 serves as a fixed member. The spring 120 is a compression coil spring, for example. The spring 120 is arranged coaxially with respect to the control shaft 13. The spring 120 has one end 121, which hooks to a hooked portion 122 of the housing 21. The spring 120 has the other end 123, which is on the side opposite to the hooked portion 122, hooking to a step 124, which is formed with the plate face 104 of the connecting portion 102 and the end 105 of the output shaft 41. In the above structure, resilience arising in the spring 120 is transmitted to the roller 43 via the movable member 101, so that the roller 43 is urged, i.e., biased onto the cam 112. Here, the roller 43 is biased in the direction, which is equivalent to the direction, in which the valve reactive force acts to the control shaft 13. That is, resilience of the spring 120 acts in the direction, in which the valve reactive force acts to the control shaft 13. The roller 43 is biased onto the cam 112 by the spring 120 at least in a condition, in which the valve reactive force applied to the control shaft 13 decreases.

In this embodiment, the roller 43 of the direct acting follower 100 is biased to the cam 112, so that the roller 43 is capable of being pressed onto the cam 112, even when the valve reactive force acting to the control shaft 13 becomes excessively small. Thereby, the direct acting follower 100 and the control shaft 13 are capable of being linearly moved steadily in accordance with rotation of the cam 112, and the valve lift is capable of being changed steadily in accordance with the axial position of the control shaft 13, regardless of the valve reactive force. Thus, in this structure, the valve lift can be controlled, while engine performance is maintained.

In this structure, the cam 112 is hard to depart from the roller 43, onto which the cam 112 is pressed to be in contact, so that noise and abrasion, which are due to repeating departure and contact, can be restricted from arising.

Besides, the contact member (the roller 43) is biased onto the fixed member (housing 21) by resilience of the spring 120, so that the biasing structure of the contact member can be simplified. In addition, friction between the cam 52 and the roller 43 can be reduced.

Fourth Embodiment

As shown in FIG. 10, this embodiment is a variation of the third embodiment. In this embodiment, the valve reactive force acts to the control shaft 13 as axial force oriented to an actuator 130.

A spring 132 is interposed between an engine head 133 and the control shaft 13 in the actuator 130. The spring 132 serves as a biasing member. The engine head 133 serves as a fixed member, which is secured to the engine 500. The spring 132 is a compression coil spring, for example. The spring 132 is arranged coaxially with respect to the control shaft 13. The spring 132 has one end 134, which hooks to a hooked portion 135 of an engine head 133. The spring 132 has the other end 136, which is on the side opposite to the hooked portion 135, hooking to a flange 137, which is formed in the control shaft 13. In the above structure, resilience arising in the spring 132 is transmitted to the roller 43 via the control shaft 13, the output shaft 41, and the movable member 101, so that the roller 43 is urged, i.e., biased onto the cam 112. Here, the roller 43 is biased in the direction, which is equivalent to the direction, in which the valve reactive force acts to the control shaft 13. That is, resilience of the spring 132 acts in the direction, in which the valve reactive force acts to the control shaft 13. The roller 43 is biased onto the cam 112 by the spring 132 at least in a condition, in which the valve reactive force applied to the control shaft 13 decreases.

In this embodiment, the roller 43 of the direct acting follower 100 is biased onto the cam 112, so that the structure in this embodiment produces an effect similarly to the third embodiment.

Fifth Embodiment

Figure 11:
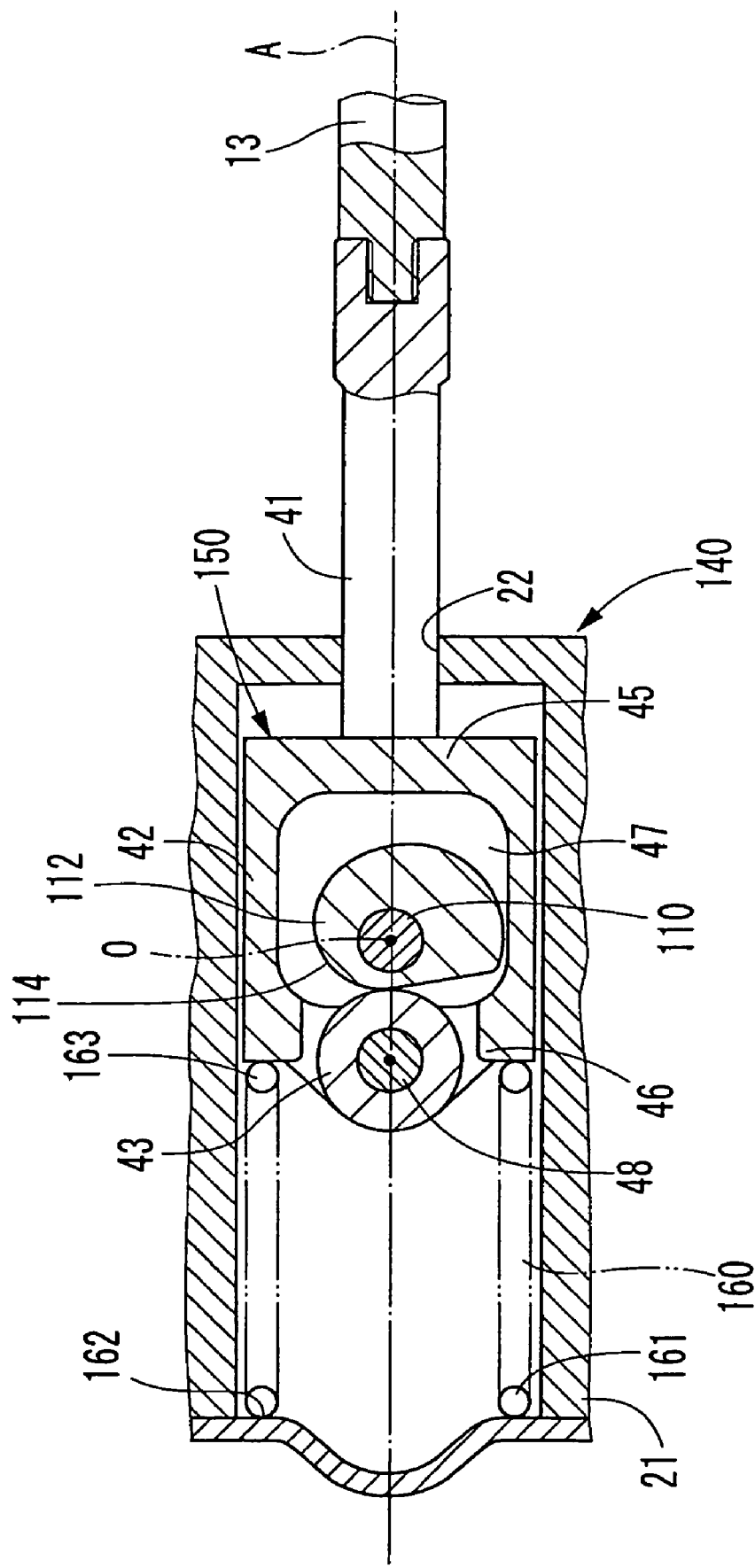
FIG. 11 is a partially cross sectional side view showing an actuator of the valve lift control device according to a fifth embodiment of the present invention.

As shown in FIG. 11, this embodiment is a variation of the third embodiment. In this embodiment, the valve reactive force acts to the control shaft 13 as axial force. The valve reactive force acts to the side opposite to an actuator 140 with respect to the control shaft 13.

The actuator 140 includes a direct acting follower 150 that has a structure similar to the structure of the direct acting follower 40 in the first embodiment, excluding the following differences. That is, the direct acting follower 150 does not have the contact member 44, and the direct acting follower 150 has a cam 112, which is in contact with the roller 43 instead of the first cam 52. Therefore, the cam 112 is accommodated in the space 47 of the movable member 42, which constructs a main body of the direct acting follower 150.

A spring 160 is interposed between the housing 21 and the direct acting follower 150 in the actuator 140. The spring 160 serves as a biasing member. The housing 21 serves as a fixed member. The spring 160 is a compression coil spring, for example. The spring 160 is arranged coaxially with respect to the control shaft 13. The spring 160 has one end 161, which hooks to a hooked portion 162 of the housing 21. The spring 160 has the other end 163, which is on the side opposite to the hooked portion 162, hooking to the other end 46 of the movable member 42, which rotatably supports the roller 43. In the above structure, resilience arising in the spring 160 is transmitted to the roller 43 via the movable member 42, so that the roller 43 is urged, i.e., biased onto the cam 112 by the resilience. Here, the roller 43 is biased in the direction, which is equivalent to the direction, in which the valve reactive force acts to the control shaft 13. That is, resilience of the spring 160 acts in the direction, in which the valve reactive force acts to the control shaft 13. The roller 43 is biased onto the cam 112 by the spring 160 at least in a condition, in which the valve reactive force applied to the control shaft 13 decreases.

In this embodiment, the roller 43 of the direct acting follower 150 is biased onto the cam 112, so that the structure in this embodiment produces an effect similarly to the third embodiment.

Sixth Embodiment

Figure 12:
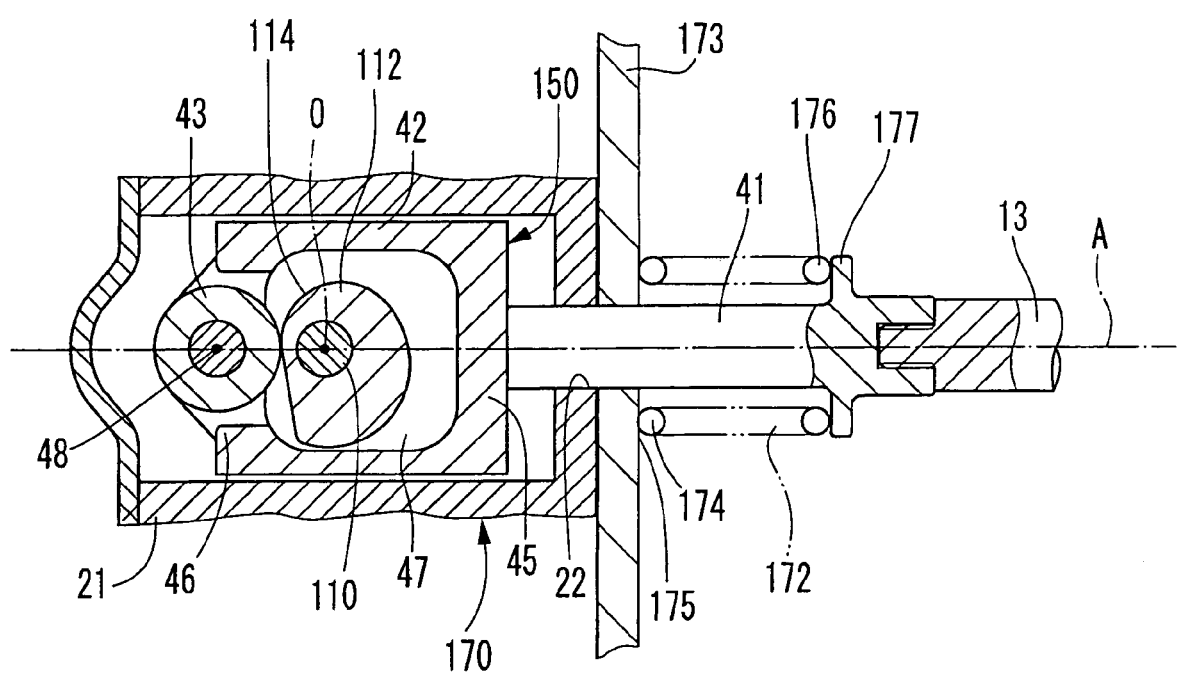
FIG. 12 is a partially cross sectional side view showing an actuator of the valve lift control device according to a sixth embodiment of the present invention.

As shown in FIG. 12, this embodiment is a variation of the fifth embodiment. In this embodiment, the valve reactive force acts to the control shaft 13 as axial force. The valve reactive force acts to the side opposite to an actuator 170 with respect to the control shaft 13.

A spring 172 is interposed between the engine head 173 and the output shaft 41 in the actuator 170. The spring 172 serves as a biasing member. The engine head 173 serves as a fixed member, which is secured to the engine 500. The output shaft 41 constructs a main body of the direct acting follower 150. The spring 172 is a compression coil spring, for example. The spring 172 is arranged coaxially with respect to the output shaft 41 and the control shaft 13. The spring 172 has one end 174, which hooks to a hooked portion 175 of the engine head 173. The spring 172 has the other end 176, which is on the side opposite to the hooked portion 175, hooking to a flange 177, which is provided to the end of the output shaft 41. The end of the output shaft 41, to which the flange 177 is provided, links with the control shaft 13. In the above structure, resilience arising in the spring 172 is transmitted to the roller 43 via the output shaft 41 and the movable member 42, so that the roller 43 is urged, i.e., biased onto the cam 112 by the resilience. Here, the roller 43 is biased in the direction, which is equivalent to the direction, in which the valve reactive force acts to the control shaft 13. That is, resilience of the spring 172 acts in the direction, in which the valve reactive force acts to the control shaft 13, with respect to the control shaft 13. The roller 43 is biased onto the cam 112 by the spring 172 at least in a condition, in which the valve reactive force applied to the control shaft 13 decreases.

When the valve reactive force, which acts onto the control shaft 13, decreases, the roller 43 is biased in the direction, in which resilience applied to the roller 43 increases with respect to the cam 112.

In this embodiment, the roller 43 of the direct acting follower 150 is biased onto the cam 112, so that the structure in this embodiment produces an effect similarly to the fifth embodiment.

In the above first to sixth embodiments, the electric motor 30 is used for generating torque to rotate the cams such as the first and second cams, so that the torque can be easily controlled. Thereby, the control shaft can be tightly and accurately controlled in the axial position, and the valve lift can be tightly and accurately controlled. A hydraulic motor or the like can be used as a power source, which generates torque, as well as the electric motor.

In the first and second embodiments, the relationship of the rotation angles of the first and second cams 52, 53 with respect to the cam lifts h1, h2 may not be proportional to each other, as long as the sum of the cam lift h1 of the first cam 52 at the first contact point C1 and the cam lift h2 of the second cam 53 at the second contact point C2 is substantially constant.

In the first and second embodiments, at least two of the rotative angular ranges may be intermittently set in the direction, in which the first and second cams 52, 53 rotates. In each of the rotative angular ranges, the sum of the cam lift h1 of the first cam 52 at the first contact point C1 and the cam lift h2 of the second cam 53 at the second contact point C2 is substantially constant.

In the above first to sixth embodiments, a variable device, which has a structure different from the structure of the variable device 12 shown in FIG. 2, may be combined with the actuators 20, 86, 90, 130, 140, 170, as long as the valve lift is changed in accordance with the axial position of the control shaft.

The structure of the present invention including the first to sixth embodiments may be applied to an actuator for a valve lift control device to control the valve lift of an exhaust valve 611 connected to a rocker arm 619 (FIG. 1A) in the engine 500.

The structures of the above embodiments can be combined as appropriate.

Various modifications and alternations may be diversely made to the above embodiments without departing from the spirit of the present invention.

What is claimed is:

1. An actuator for a valve lift control device that controls valve lift of at least one of an intake valve and an exhaust valve of an internal combustion engine, the actuator linearly moving a control shaft in an axial direction of the control shaft to change the valve lift in accordance with a position of the control shaft in the axial direction of the control shaft, the actuator comprising:

a first rotation cam and a second rotation cam that integrally rotate around a common rotation axis by transmission of torque; and a direct acting follower that includes a first contact member and a second contact member, wherein the first contact member is in contact with the first rotation cam via a first contact point, the second contact member is in contact with the second rotation cam via a second contact point, the direct acting follower linearly moves with the control shaft as the first rotation cam and the second rotation cam rotate, the first contact point is located on a substantially opposite side of the second contact point with respect to the common rotation axis, the first rotation cam has a first rotation cam lift at the first contact point, the second rotation cam has a second rotation cam lift at the second contact point, the first rotation cam lift and the second rotation cam lift have a sum thereof, and the sum of the first rotation cam lift and the second rotation cam lift is substantially constant in a predetermined rotation angular range of the first rotation cam and the second rotation cam.

2. The actuator according to claim 1, wherein the sum of the first rotation cam lift and the second rotation cam lift is substantially constant substantially throughout the predetermined rotation angular range, in which the first rotation cam and the second rotation cam are rotatable.

3. The actuator according to claim 1, wherein the first rotation cam has a first rotation cam profile, the second rotation cam has a second rotation cam profile, and the first rotation cam profile and the second rotation cam profile are substantially axisymmetric with respect to an imaginary line, which is perpendicular to the common rotation axis.

4. The actuator according to claim 1, further comprising:

an electric motor that generates torque transmitted to the first rotation cam and the second rotation cam.

* * * * *